(12) United States Patent
Yamamoto

(10) Patent No.: US 8,326,989 B2
(45) Date of Patent: Dec. 4, 2012

(54) IMAGE PROCESSING APPARATUS, CONTROL METHOD FOR IMAGE PROCESSING APPARATUS, AND PROGRAM

(75) Inventor: Masahito Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 123 days.

(21) Appl. No.: 12/863,308

(22) PCT Filed: Jun. 3, 2010

(86) PCT No.: PCT/JP2010/059805
§ 371 (c)(1),
(2), (4) Date: Jul. 16, 2010

(87) PCT Pub. No.: WO2010/150655
PCT Pub. Date: Dec. 29, 2010

(65) Prior Publication Data
US 2011/0125899 A1    May 26, 2011

(30) Foreign Application Priority Data
Jun. 23, 2009  (JP) ................................ 2009-149053

(51) Int. Cl.
*G06F 15/173* (2006.01)
(52) U.S. Cl. .................... 709/225; 709/223; 709/224
(58) Field of Classification Search .................. 709/225, 709/223, 224; 707/10
See application file for complete search history.

(56) References Cited

U.S. PATENT DOCUMENTS

| | | | |
|---|---|---|---|
| 6,553,431 B1 | 4/2003 | Yamamoto | |
| 2005/0187941 A1* | 8/2005 | Kanasaki | ...................... 707/10 |
| 2006/0092448 A1 | 5/2006 | Machida | |
| 2008/0150952 A1 | 6/2008 | Koarai | |
| 2009/0021780 A1 | 1/2009 | Sato | |
| 2009/0080013 A1 | 3/2009 | Sato | |

FOREIGN PATENT DOCUMENTS

| | | |
|---|---|---|
| CN | 101237499 | 8/2008 |
| JP | 2005-242994 | 9/2005 |
| JP | 2006-166292 | 6/2006 |
| JP | 2008-139981 | 6/2008 |

OTHER PUBLICATIONS

U.S. Appl. No. 12/880,971, filed Sep. 13, 2010.
International Preliminary Report on Patentability (Chapter I), dated Jan. 12, 2012, issued during prosecution of related International Application No. PCT/JP2010/059805.

* cited by examiner

*Primary Examiner* — Adnan Mirza
(74) *Attorney, Agent, or Firm* — Fitzpatrick, Cella, Harper & Scinto

(57) ABSTRACT

An image processing apparatus connected to a Web server and including a Web browser for displaying an operation screen provided by the Web server and a processing unit that, when requested to execute image processing by the Web server based on access from the Web browser, executes the requested image processing, where it is determined, depending on a destination of access by the Web browser, whether or not to supply information about the image processing apparatus to the destination of access, and if it is determined that the information about the image processing apparatus should be supplied, the information about the image processing apparatus is supplied to the destination of access made by the Web browser.

12 Claims, 13 Drawing Sheets

FIG. 7 https://www.example.com/start

| SCAN SETTING/TRANSMISSION SETTING |

■ SCAN AND TRANSMIT TO FTP SERVER
SET ORIGINAL AND DEPRESS START BUTTON

FILE NAME  test.pdf

IMAGE FORMAT   ● PDF   ○ JPEG

EXECUTE 701
action="https://www.example.com/scan-to-ftp/start"

FIG. 11

| SERVICE ID | VERSION | STATE | CONNECTION | CONNECTION URI (PATH SECTION) |
|---|---|---|---|---|
| ScanToFTP | 2.0 | active | SOAP | /sp/scan-push-ftp |
| ScanToFTPImmediate | 1.8 | active | SOAP | /sp/scan-noconfirm-push-ftp |
| ScanToFTPWithOCR | 1.2 | inactive | SOAP | /sp/scan-ocr-push-ftp |
| ScanToFTPWithEncryption | 1.0 | inactive | SOAP | /sp/scan-encrypt-push-ftp |
| ScanToFax | 3.0 | active | SOAP | /sp/scan-push-fax |
| ScanToFaxImmediate | 1.0 | active | SOAP | /sp/scan-noconfirm-push-fax |
| PrintFromFTP | 1.0 | active | SOAP | /sp/pull-ftp-print |
| ScanFromHTTP | 1.0 | active | SOAP | /sp/pull-http-print |
| Settings | 3.8 | active | SOAP | /sp/settings |
| Log | 1.0 | active | SOAP | /sp/log |
| Log | 1.0 | active | REST | /rest-sp/log |
| Diag | 4.0 | active | SOAP | /sp/diag |
| ServiceDiscovery | 1.0 | active | SOAP | /sp/sds |

FIG. 12

| URI PATTERN SCHEME | AUTHORITY COMPONENT | PATH | SERVICE PATTERN | |
|---|---|---|---|---|
| http: | //s1.example.com | /* | * | (ALL NOTIFIED) |
| https: | //s1.example.com | /* | * | (ALL NOTIFIED) |
| https: | //www.example.com | /diag | Diag | |
| https: | //www.example.com | /log | Log | |
| https: | //www.example.com | /settings | Settings Diag Log | |
| https: | //www.example.com | /*/scan-to | ScanTo* | (SERVICE ID STARTS WITH "ScanTo") |
| https: | //www.example.com | /*/*print* | *Print* | (SERVICE ID INCLUDES "Print") |
| http: | //www.example.com | /* | | (NOT NOTIFIED) |
| ftp: | //s2.example.com | /* | | (NOT NOTIFIED) |
| DEFAULT | | | | (NOT NOTIFIED) |

FIG. 14

```
GET/HTTP/1.1
Accept: image/gif,image/jpeg,*/*
Accept-Language: ja
Accept-Encoding: gzip,deflate
User-Agent: iRBrowser/4.0 (compartible;:/sp/scan-ftp 2.0;:/sp/scan-preview-ftp 1.8;:/sp/ipp-print 3.0;)
Host: server201.example.com
Connection: Keep-Alive
```

IMAGE PROCESSING APPARATUS, CONTROL METHOD FOR IMAGE PROCESSING APPARATUS, AND PROGRAM

This application is a National Stage application under 35 U.S.C. §371 of International Application No. PCT/JP2010/059805, filed on Jun. 3, 2010, which claims priority to Japanese Application No. 2009-149053, filed on Jun. 23, 2009, the contents of each of the foregoing applications being incorporated by reference herein.

TECHNICAL FIELD

The present invention relates to an image processing apparatus connected to a Web server and having a Web browser for displaying an operation screen provided by the Web server, a control method for the image processing apparatus, and a program for causing a computer to perform the control method.

BACKGROUND ART

It is a known technique to connect an information processing apparatus, such as a PC (personal computer), to a Web server on a network and display an operation screen provided by the Web server on a Web browser included in the image processing apparatus.

In such a case, the Web browser of the image processing apparatus requests an operation screen from the Web server, in response to which a Web application in the Web server sends an HTML (Hyper Text Markup Language) file for displaying the operation screen on the Web browser to the image processing apparatus. The Web browser of the image processing apparatus analyzes the HTML file received, and displays an operation screen based on description in the HTML file.

Further, when a user inputs an instruction via the operation screen displayed on the Web browser, the instruction is passed to the Web server from the Web browser. Upon receiving the instruction, the Web application of the Web server executes processing according to the instruction.

Today, some image processing apparatuses such as MFPs (Multi Function Peripherals) having a scanner and/or a printer also include a Web browser as mentioned above. Such an image processing apparatus displays an operation screen provided by a Web server on the Web browser using the above-described process to accept various instructions from users.

Still further, such a technique as one disclosed by Japanese Patent Application Laid-Open No. 2005-242994 is also proposed. According to descriptions of Japanese Patent Application Laid-Open No. 2005-242994, a Web server provides an operation screen for entering instructions for utilizing various features (services) of an image processing apparatus. That is, the user of the image processing apparatus accordingly enters an instruction to the image processing apparatus via the operation screen displayed on a Web browser. The instruction is then passed to the Web server by the Web browser of the image processing apparatus.

Upon receiving the instruction, the Web server requests the image processing apparatus to carry out any of various types of processing according to the contents of the instruction input by the user. The image processing apparatus having received this request then executes the requested processing (or provides a service). This eliminates the necessity to maintain all menu data required for operating the image processing apparatus within the image processing apparatus and also facilitates modifications to the menu data on the Web server.

When a Web server provides an operation screen for the user of an image processing apparatus to enter instructions and the Web server requests the image processing apparatus to perform processing, it is necessary to fixedly register information about services provided by the image processing apparatus with the Web server in advance.

However, an image processing apparatus generally provides a number of services, and besides, the ability and/or version of the services dynamically change with update to the services or additional installation of optional functions. Also, there can be a number of options for utilizing the services, such as a protocol and connection address information which is used for utilizing the services. These factors make it difficult to fixedly register information about service provided by an image processing apparatus with a Web server in advance.

To address this problem, Japanese Patent Application Laid-Open No. 2005-242994 discloses a technique to notify a Web server of a URL (Uniform Resource Locator), which is one of pieces of information relating to services provided by an image processing apparatus, (or service connection information) by the image processing apparatus.

However, the technique of Japanese Patent Application Laid-Open No. 2005-242994 merely supplies information about services provided by the image processing on demand from the Web server and does not switch between notification and non-notification or change the contents of information to be supplied depending on the timing of notification and/or notified entity. Therefore, depending on the timing of notification and/or notified entity, information will be supplied even when supply of the information is unnecessary in itself.

That is to say, when information on all services is supplied on every notification regardless of timing of notification and/or a notified entity, for example, the amount of data exchanged between the image processing apparatus and the Web server will increase. In addition, continuous supply of service-related information without regard to notified entity may cause leakage of sensitive information to outsiders.

The present invention has been made in view of these problems, and an object thereof is to provide a mechanism for determining, depending on which entity a Web browser accesses, whether to supply information about an image processing apparatus to the accessed entity or not before supplying the information.

Another object of the invention is to provide a mechanism to select information to be supplied to an entity which the Web browser accesses among pieces of information relating to each of multiple processing units and supplying the selected information.

DISCLOSURE OF THE INVENTION

To achieve the above-described objects, according to the present invention, there is provided an image processing apparatus connected to a Web server and including a Web browser for displaying an operation screen provided by the Web server, the image processing apparatus comprising: a processing unit that, when requested to execute image processing by the Web server based on access from the Web browser, executes the requested image processing; a determination unit that determines, depending on a destination of access made by the Web browser, whether or not to supply information about the image processing apparatus to the destination of access; and a notification unit that supplies information about the image processing apparatus to the destination of access made by the Web browser if the determination unit determines that information about the image processing apparatus should be supplied.

Further objects and features of the present invention will become apparent from the following description of the exemplary embodiments with reference to the attached drawings.

BRIEF DESCRIPTION OF THE DRAWINGS

FIG. 7 illustrates a Web browser screen in the embodiment of the invention.

FIG. 11 is a table for illustrating a service repository unit 492 in the embodiment of the invention.

FIG. 12 is a table for illustrating a URI (Uniform Resource Identifier) information storage unit 493 in the embodiment of the invention.

FIG. 14 illustrates an example of HTTP request data generated by a Web browser 440 in the embodiment of the invention.

BEST MODES FOR CARRYING OUT THE INVENTION

Hereinafter, embodiments of the present invention will be described in detail with reference to the attached drawings. Here, the embodiments described below are not intended to limit the invention as defined in the claims and not all of combinations of features shown in the embodiments are essential to the solution of the invention.
(First Embodiment)

Figure 1:
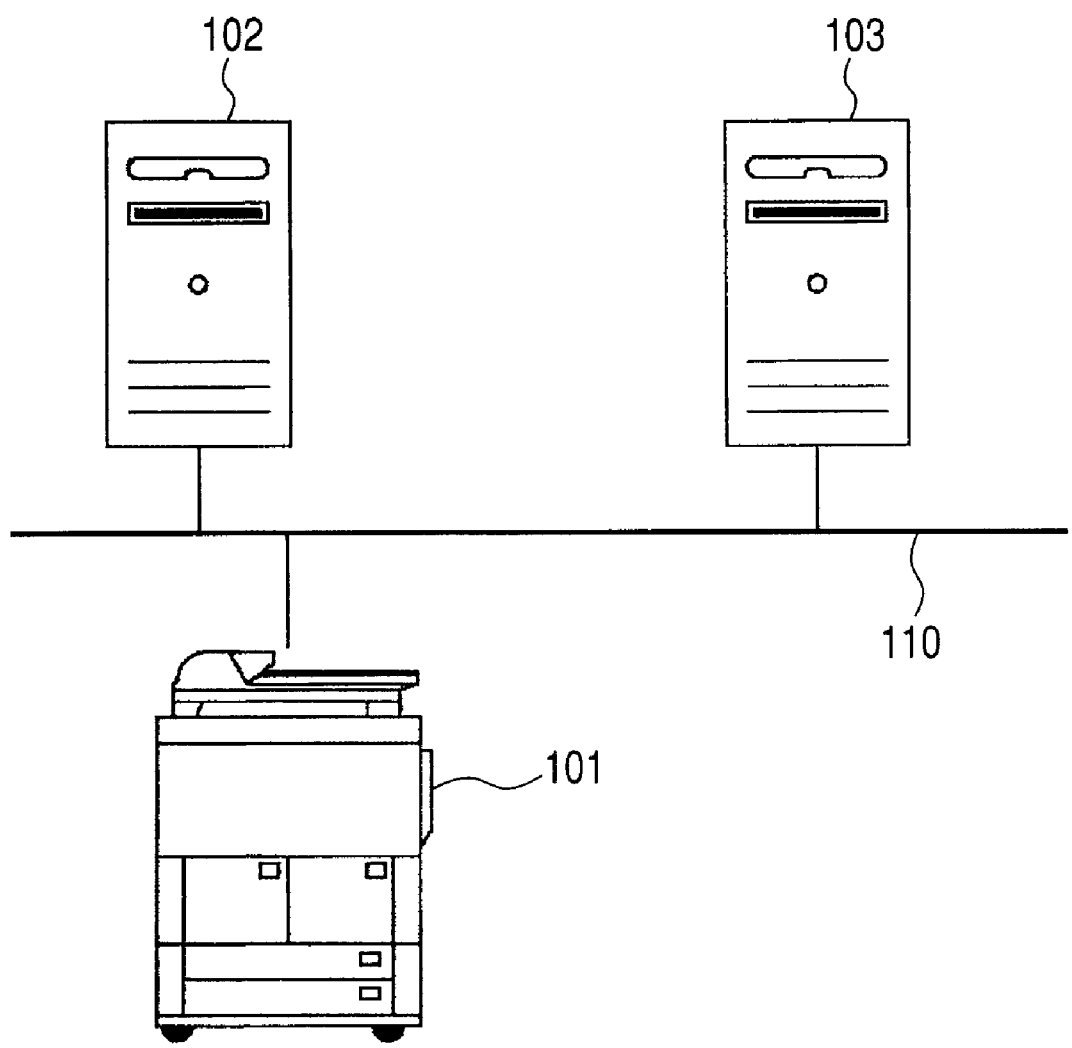
FIG. 1 is an overall view of an information processing system according to an embodiment of the present invention.

FIG. 1 is an overall view of an information processing system according to a first embodiment. An MFP 101, a file server (an LDAP (Lightweight Directory Access Protocol) server) 102, and a Web server 103 are connected to a LAN (local area network) 110 such that they can communicate with each other. An FTP (File Transfer Protocol) server not shown is also provided on the LAN 110, enabling FTP transmission of image data from the MFP 101 to the FTP server.

Figure 2:
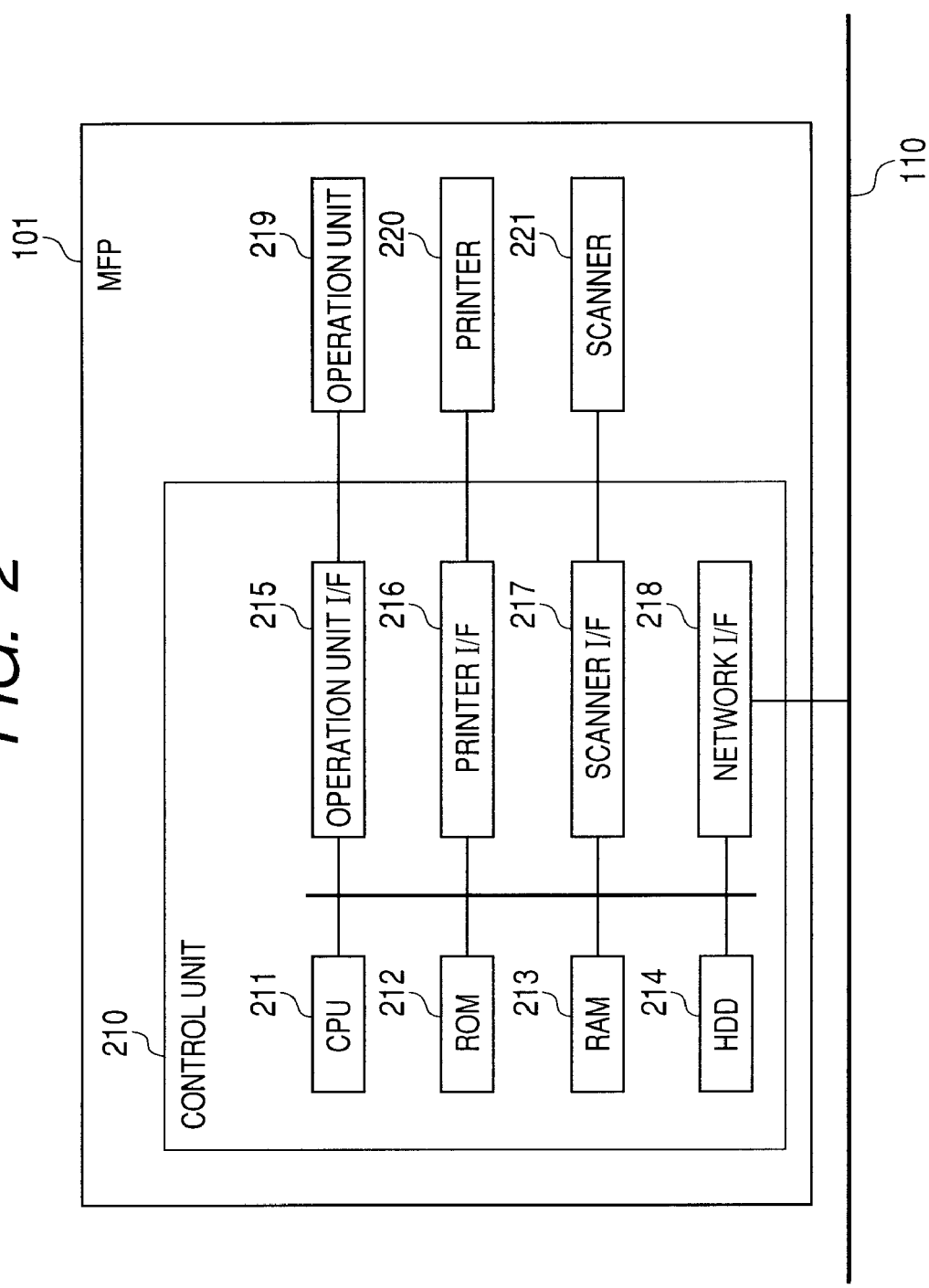
FIG. 2 is a block diagram illustrating a configuration of an MFP 101 in the embodiment of the invention.

FIG. 2 is a block diagram illustrating a configuration of the MFP 101. A control unit 210 including a CPU (central processing unit) 211 controls the operation of the entire MFP 101. The CPU 211 reads a control program stored in ROM 212 and executes various sorts of control processing, such as control of reading and transmission. RAM 213 is used as a temporary storage area, such as main memory and a work area for the CPU 211. An HDD (hard disk drive) 214 stores image data, various programs, or various information tables described below.

An operation unit I/F (interface) 215 connects an operation unit 219 with the control unit 210. The operation unit 219 has a liquid crystal display unit having touch screen panel functions, a keyboard, and the like. The MFP 101 has Web browser functions described later. A Web browser included in the MFP 101 analyzes an HTML file received from the Web server 103 and displays an operation screen based on description in the HTML file on the operation unit 219.

A printer I/F 216 connects a printer 220 with the control unit 210. Image data to be printed on the printer 220 is transferred from the control unit 210 to the printer 220 via the printer I/F 216 and printed on a recording medium by the printer 220.

A scanner I/F 217 connects a scanner 221 with the control unit 210. The scanner 221 reads an image on an original to generate image data and inputs the image data to the control unit 210 via the scanner I/F 217.

A network I/F 218 connects the control unit 210 (the MFP 101) with the LAN 110. The network I/F 218 transmits image data and/or information to an external apparatus on the LAN 110 (e.g., the file server 102, the Web server 103) or receives various types of information from an external apparatus on the LAN 110.

Figure 3:
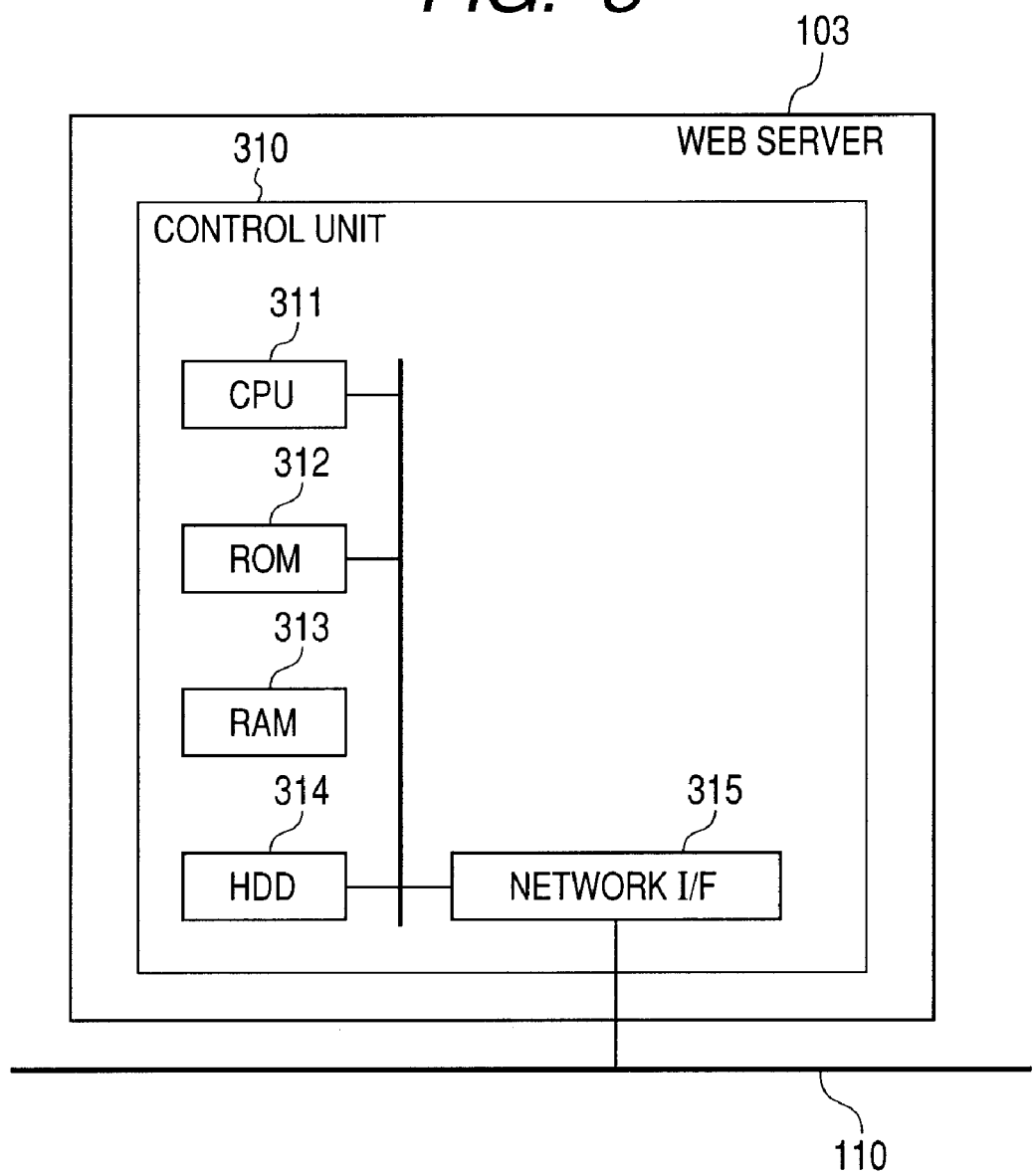
FIG. 3 is a block diagram illustrating a configuration of a Web server 103 in the embodiment of the invention.

FIG. 3 is a block diagram illustrating a configuration of the Web server 103. Assume that the file server 102 has a similar configuration to that of the Web server 103.

A control unit 310 including a CPU 311 controls the operation of the entire Web server 103. The CPU 311 reads a control program stored in ROM 312 and executes various sorts of control processing. An RAM 313 is used as a temporary storage area, such as main memory and a work area for the CPU 311. An HDD 314 stores image data, various programs, or various information tables described below.

A network I/F 315 connects the control unit 310 (the Web server 103) with the LAN 110. The network I/F 315 sends and receives various types of information to and from other apparatus on the LAN 110.

Figure 4:
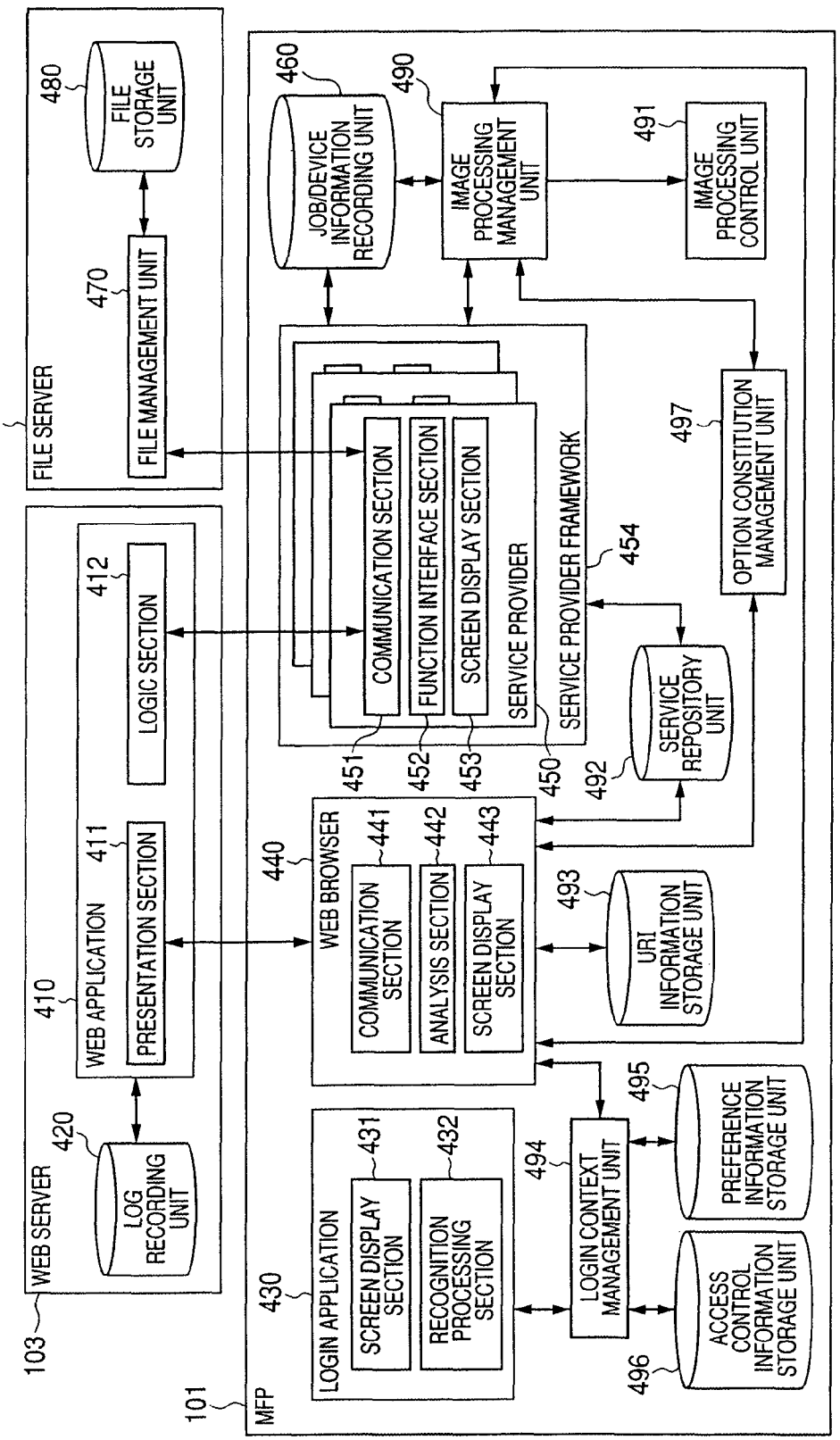
FIG. 4 illustrates a software configuration of the information processing system in the embodiment of the invention.

FIG. 4 is a diagram for illustrating a software configuration of the entire information processing system. The functional units illustrated in FIG. 4 are realized by the CPUs in the MFP 101, file server 102, and Web server 103 executing a control program.

The MFP 101 includes a login application 430, a Web browser 440, a service provider framework 454 including a number of service providers 450, a job/device information recording unit 460, an image processing management unit 490, and an image processing control unit 491. The MFP 101 also includes a service repository unit 492, a URI information storage unit 493, a login context management unit 494, a preference information storage unit 495, an access control information storage unit 496, and an option constitution management unit 497.

The login application 430 includes a screen display section 431 and an authentication processing section 432. The screen display section 431 displays an authentication screen on the operation unit 219 for prompting a user to input authentication information required for authentication processing executed by the authentication processing section 432. This authentication screen is not provided by the Web server 103 but is displayed by reading information maintained within the MFP 101 by the login application 430. A screen that is thus displayed based on information prestored in the MFP 101 will be called a native screen.

When authentication information is entered from the authentication screen displayed by the screen display section 431, the authentication processing section 432 performs processing for user authentication using the authentication information entered.

When performing an authentication process, the authentication processing section 432 compares the authentication information input via the authentication screen displayed by the screen display section 431 with authentication information stored in the HDD 214. According to the result of the comparison, use of the MFP 101 by the user is permitted.

The Web browser 440 includes a communication section 441, an analysis section 442, and a screen display section 443. The communication section 441 communicates with a presentation section 411 of the Web application 410 by the HTTP protocol. More specifically, the communication section 441 sends a GET or POST HTTP request for a resource of the Web application 410 identified by a URI. That is to say, the Web browser 440 makes an access to the specified URI. Then, as an HTTP response to the HTTP request, the Web browser obtains an operation screen written in HTML or the like for display on the Web browser from the Web application 410. The Web browser also passes instructions from the user, which are entered into an HTML form or the like displayed on the Web browser, to the Web application 410 via an HTTP request.

The analysis section 442 analyzes an HTML file received from the Web application 410. The HTML file contains description representing contents of the operation screen to be displayed on the Web browser.

The screen display section 443 displays an operation screen on the operation unit 219 based on the result of analysis by the analysis section 442. A screen that is thus displayed based on information (an HTML file) received from the Web server 103 will be called a Web browser screen.

The file server 102 includes a file management unit 470 and a file storage unit 480. The file storage unit 480 stores various data files including files of image data scanned in by the MFP 101. The file management unit 470 manages files stored in the file storage unit 480.

The Web server 103 includes the Web application 410 and a log recording unit 420. Further, the Web application 410 includes the presentation section 411 and a logic section 412. The Web application 410 performs processing in the logic section 412 according to an HTTP request received. The presentation section 411 generates data, such as HTML, and sends the data to the Web browser as an HTTP response.

The presentation section 411 communicates with communication section 441 and sends an operation screen to the MFP 101 for display on the Web browser of the MFP 101 on demand from the MFP 101. The presentation section 411 also receives instructions from the user input via the operation screen displayed on the Web browser of the MFP 101 from the MFP 101 as an HTTP request.

Having received the user's instruction as an HTTP request, the Web application 410 executes various sorts of processing as appropriate for the instruction and also requests the MFP 101 to execute processing. To be specific, the Web application 410 requests execution of printing on the printer 220 of the MFP 101, scanning by the scanner 221, or transmission via the network I/F 218. The Web application 410 also requests accumulation or retrieval of a document in the HDD 214, facsimile transmission/reception over a facsimile line (not shown), or the like.

To request the MFP 101 to execute processing in this way, the logic section 412 communicates with the communication section 451 of the service providers 450 included in the MFP 101. The result of processing executed by the MFP 101 is recorded in the log recording unit 420. In the log recording unit 420, results of authentication executed on the Web server 103 are also recorded.

The service provider framework 454 manages multiple service providers 450. With the service provider framework 454, it is possible to manage the life cycle of the service providers 450, i.e., installation, uninstallation, update, activation, and deactivation. The service provider framework 454 also provides an interface connecting between the service providers 450 and other software.

The service providers 450 each include a communication section 451, a function interface section 452, and a screen display section 453. The communication section 451 accepts a processing request from the logic section 412 of the Web application 410. When execution of processing is requested by the Web application 410, the function interface section 452 executes processing as appropriate for the requested processing.

When any of the service providers 450 is requested to execute an image processing function, for example, the function interface section 452 generates a job for that function and executes the job utilizing the image processing management unit 490. The service providers 450 also perform job control, such as pause, resumption, cancel, or change of priority of jobs, and/or management such as job monitoring, utilizing the image processing management unit 490. The service providers 450 further reference or update history, counter, or setting information stored in the job/device information recording unit 460. The service providers 450 further make reference to service provider information stored in the service repository unit 492 to learn types of services that can be provided by the MFP 101, their version, and/or a connection method for utilizing the services.

Further, the service providers 450 send data to the file storage unit 480 and receive data from the file storage unit 480 through communication between the communication section 451 and the file management unit 470 of the file server 102. Specifically, there are a service provider that uploads image data read by the scanner 221 to the file server 102, and a service provider that receives printing data from the file server 102 and prints the data on the printer 220.

The screen display section 453 displays an operation screen on the operation unit 219 that is necessary for executing any of the service providers 450. That is to say, the screen display section 453 displays an operation screen on the operation unit 219 for checking or configuring parameters for job execution, monitoring job execution, recovering from an error such as a jam that occurs during execution of a job, or managing job status, such as interruption and cancel of a job. The result of job execution is recorded in the job/device information recording unit 460 as a log.

Incidentally, in the job/device information recording unit 460, history and the like of a job that is activated by a requestor other than the service providers 450, e.g., the operation unit 215, and executed by the image processing management unit 490 is also recorded. The results of authentication executed by the login application 430 and/or history of communication with the Web server 103 are also recorded in the job/device information recording unit 460.

The job/device information recording unit 460 also summarizes and records various kinds of statistical information for a job execution. The statistical information includes counters for the number of paper sheets input and output, the number of pages on which image processing has been executed, the capacity of memory, the usage amount of functional modules, and the like, for example.

The job/device information recording unit 460 also stores status information for running jobs. The job/device information recording unit 460 also records status and/or configuration information for managing the apparatus units of the MFP 101, such as the operation unit 215, printer 220, scanner 221, and control unit 210.

The image processing management unit 490 manages the image processing control unit 491 and executes an image processing job in response to a request from a requestor, such as the function interface section 452. The image processing control unit 491 controls various units of the MFP 101, such as the operation unit 215, printer 220, scanner 221, control unit 210, for executing an image processing job. The image processing management unit 490 also performs job management, such as monitoring, pause, resumption, cancel, and change of priority for running jobs.

The service repository unit 492 stores information about the service providers 450 managed by the service provider framework 454. The Web browser 440 can reference or update information stored in the service repository unit 492.

The URI information storage unit 493 manages Uniform Resource Identifier (URI) information as means for identifying resources on the Web. The notion of Uniform Resource Locator (URL) is included in URI. The URI information storage unit 493 manages a URL (a homepage URL) identifying a Web page that is automatically retrieved by the Web browser 440 at the time of startup, for example. The URI information storage unit 493 also manages URLs identifying Web pages that can be displayed on the Web browser 440 in one pass such as by operating a button on the operation unit 219 (e.g., URLs of bookmarks and a site-specific browser). The URI information storage unit 493 also manages pattern matching rules for retrieving service information associated with a pattern of a URI from the service repository unit 492 based on the pattern.

The login context management unit 494 manages session information relating to a user who is using the operation unit 219. The operation of various functions of the MFP 101 is personalized according to the session information. Specifically, operation parameters preferred by the user is given a higher priority the information stored in the preference information storage unit 495. The login context management unit 494 also prohibits or continues an operation according to an authority level given to the user as stored in the access control information storage unit 496. Operations activated by the service providers 450 are also subject to such personalization.

The preference information storage unit 495 stores preference information for representing various preferences about operation of the MFP 101 for each individual user who uses the MFP 101. Preference information refers to such information that a user prefers black/white processing to color processing, prefers letter size to A4 as paper size, prefers transmission in a short procedure omitting a checking step to transmission after checking a preview of a scanned-in image, or like information. Preference information can be preset in the preference information storage unit 405 by the user and/or administrator. Preference information could also be automatically determined from a user's past operation history and automatically set in the preference information storage unit 405.

The access control information storage unit 496 stores access control information for controlling access, such as execution, readout, and write, to various functions and resources provided by the MFP 101 for each of multiple users who use the MFP 101. Access control information refers to information that color processing is prohibited and black/white processing is permitted, one-sided printing is prohibited and double-sided printing is permitted, transmission of documents is prohibited and copying is permitted, change to configured parameters for the administrator is prohibited and change to those for a general user is permitted, or like information. Access control information can be preset in the access control information storage unit 496 by the system administrator. Also, an ACL (access control list) or the like stored and managed on an external server could be configured to be utilized via a network.

The option constitution management unit 497 manages configuration of option units that are selectively attached to the MFP 101 and/or option functions that can be utilized by selectively installing an add-in application or a license. Option constitutions managed by the option constitution management unit 497 include: device configuration information indicating presence/absence of a scanner unit 221 and/or a facsimile unit; accessory configuration information indicating the attachment condition or type of a paper feeder unit, a paper ejector/finisher, a stacker of the printer 220, or a document feeder of the scanner 221; attachment condition information for a user authentication device, such a biometric authentication device and an IC card reader, or an optional device for USB connection, such as a keyboard and a pointing device; information indicating installation condition of optional functions, such as whether an add-in document management function is present or not; and information about whether additional features for various functions are made active by a license, such as encrypted transmission feature for a transmitted document and a searchable document transmission feature for subjecting an image read by a scanner to OCR (optical character recognition) and sending the image with searchable text.

Figure 5:
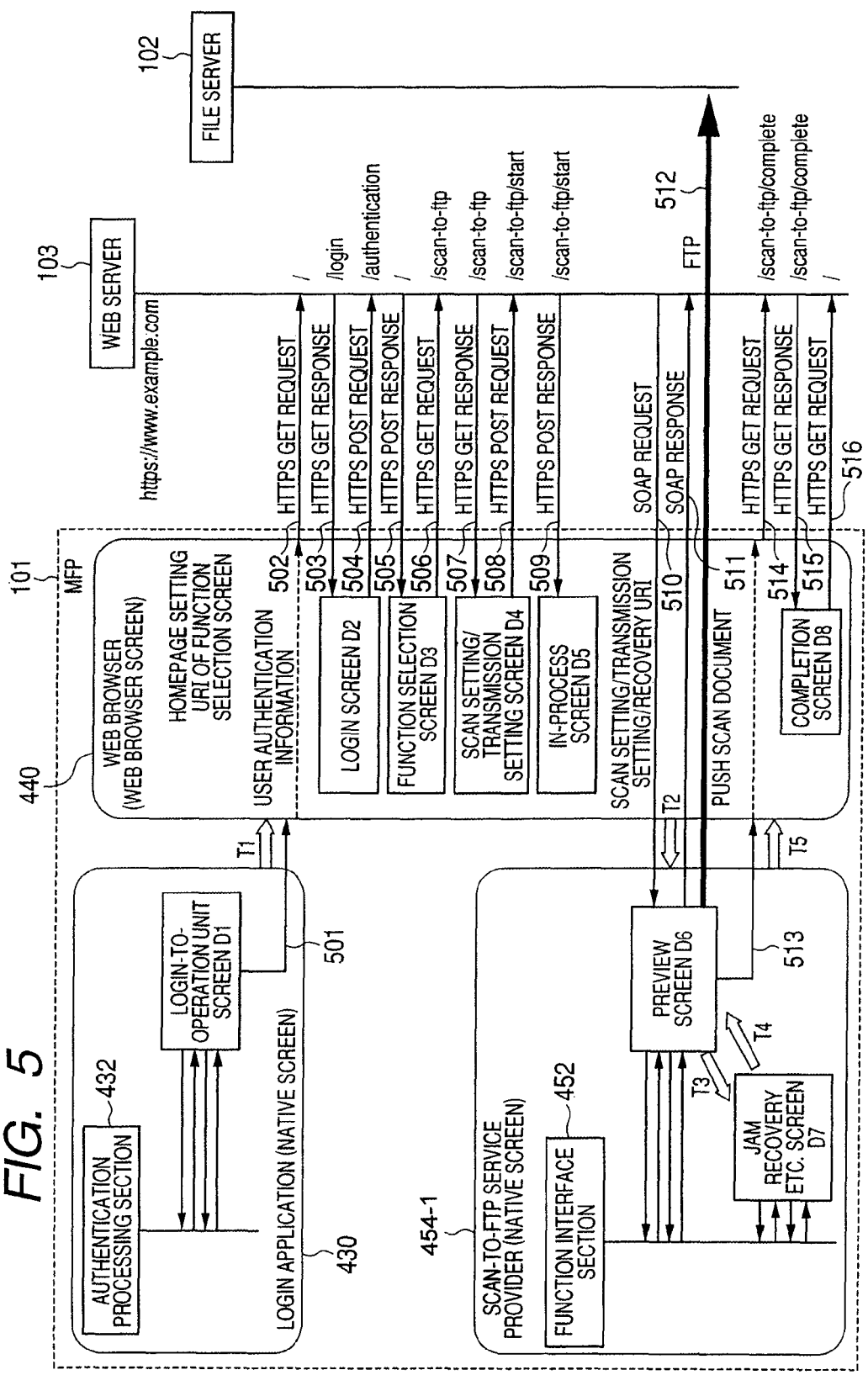
FIG. 5 is a sequence chart illustrating operations of the MFP 101, the Web server 103, and a file server 102 to carry out a sequence of processing in the embodiment of the invention.

FIG. 5 is a diagram for illustrating interaction in the entire image processing system. The sequence of FIG. 5 is realized through cooperative execution of control programs by the CPUs included in the MFP 101, the file server 102, and the Web server 103 respectively.

When the user starts operation of the MFP 101, user authentication is required of the user. On the operation screen of the operation unit 219, a login-to-operation unit screen D1 displayed by the login application 430 appears. When the user performs authentication operations, a user authentication process is performed by the login application 430 and the authentication processing section 432. When the user authentication succeeds, a login process takes place and the login application 430 sets user authentication information in an operation-unit session management data structure of the login context management unit 494. The operation screen on the operation unit 219 changes to a Web browser screen registered as an initial screen after login (screen transition T1). At the same time, user authentication information and a login event 501 are passed from the login application 430 to the Web browser 440.

When displayed in the initial state, the Web browser 440 sends an HTTP GET request to a predetermined URI according to preset homepage setting. When the designated URI specifies secure HTTP communication, an HTTPS GET request 502 is transmitted by the HTTPS protocol over SSL (Secure Socket Layer). In the HTTPS GET request 502, user authentication information based on the user authentication performed by the login application 430 is also transmitted.

Upon receiving the HTTPS GET request 502, the Web server 103 selects a Web application that should be executed and its processing logic based on the specified URI, and executes the application. Suppose the URI is "https://www.example.com/", for example. When the Web application of the Web server 103 is configured to require user authentication as a Web server, the user is redirected to a URI at which user authentication is executed regardless of the specified URI. That is to say, even when the specified URI is a URI representing retrieval of a function selection screen D3, the user is redirected to a URI corresponding to the login screen D2. As a result, the Web server 103 generates an HTML document corresponding to the login screen D2, and sends the HTML document data in an HTTPS GET response 503. When the Web application is configured not to require user authentication or configured to trust user authentication already completed on the MFP 101 as indicated in an HTTP request, the sending back of the login screen D2 may be omitted. That is to say, HTML data representing the function selection screen D3 is returned as a response as specified by the HTTPS GET request 502.

Upon receiving the HTTPS GET response 503, the Web browser 440 displays the login screen D2 based on the HTML received. The login screen D2 is designed as an HTML form. The user enters information asserting that the user is a legitimate user on the login screen D2 and submits the information. Then, an HTTP request containing the information entered by the user as a query character string is transmitted to a URI that is embedded in Action attribute of Form element in the HTML form. If Method attribute of the Form element in the form is set to "post", the information is sent as an HTTPS POST request 504. If Method attribute is set to "get" here, the information is sent as an HTTPS GET request in which the query character string is embedded in a portion of the URI.

Upon receiving the HTTPS GET request, the Web server 103 performs user authentication. When the user authentication succeeds, the Web server 103 generates HTML corresponding to the function selection screen D3 based on the path section (/) of the URI that is originally requested (https://www.example.com/), and sends an HTTPS POST response 505.

Upon receiving the HTTPS POST response 505, the Web browser 440 displays the function selection screen D3 based on the HTML received.

Figure 6:
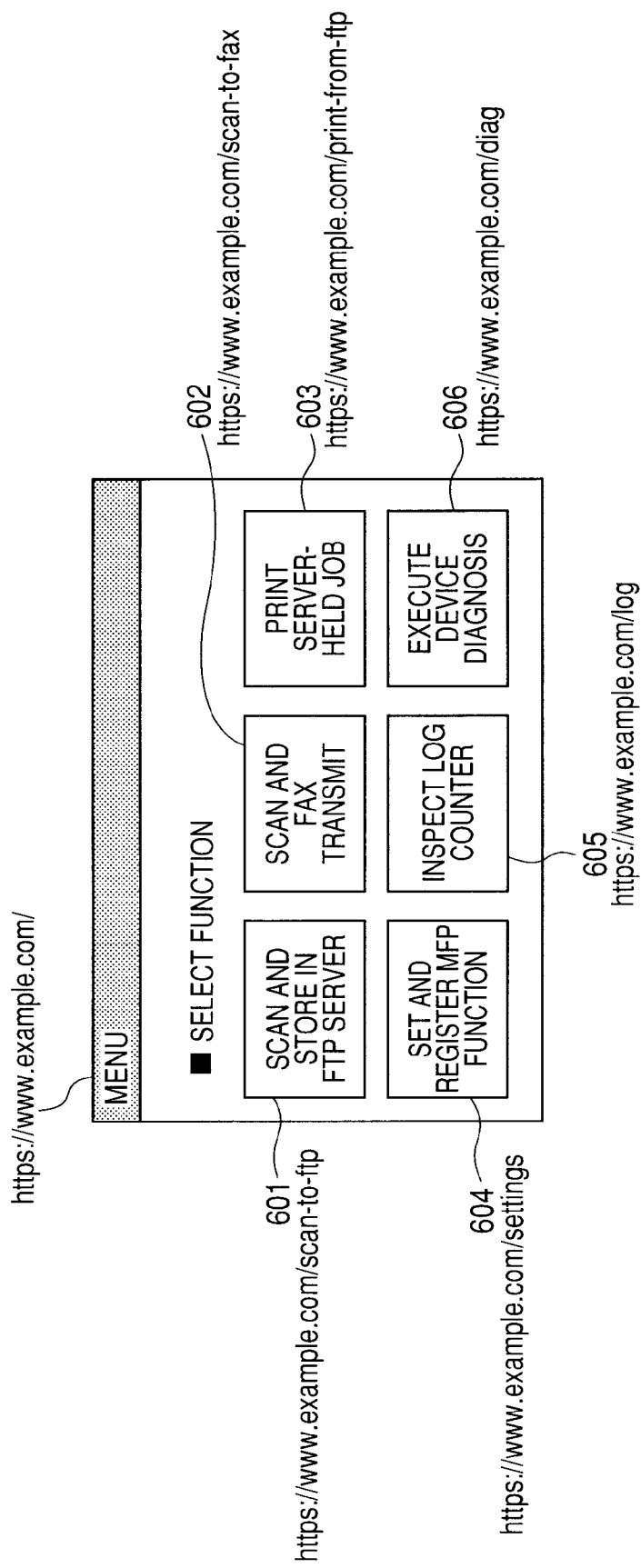
FIG. 6 illustrates a Web browser screen in the embodiment of the invention.

FIG. 6 illustrates an example of the function selection screen (i.e., a Web browser screen). The function selection screen D3 is a menu for selecting from a number of Web applications provided by the Web server 103. The screen of FIG. 6 is made up of a number of button images each with an anchor element ("a" element) of HTML assigned. When the user chooses a button 601, for example, an HTTPS GET request 506 specifying a URI that identifies a Web application implementing a push scan function based on FTP (File Transfer Protocol) is transmitted. Suppose the URI is "https://www.example.com/scan-to-ftp". After receiving the request, the Web server 103 selects a Web application according to the path section ("/scan-to-ftp") of the specified URI and executes processing for the request. The Web server 103 generates an HTML document corresponding to the initial screen for the FTP push scan function, and sends the document as an HTTPS GET response 507. The Web browser 440 displays a scan setting/transmission setting screen D4 based on the HTML received. When any of other buttons 602, 603, 604, 605, and 606 is selected, similar exchanges are executed.

FIG. 7 illustrates an example of the scan setting/transmission setting screen (i.e., a Web browser screen). Shown is an example screen for requesting scanning of an image on a document using the scanner 221 of the MFP 101 to generate image data and transmission of the image data to the FTP server 102 on the LAN 110. The example shown in FIG. 7 represents a state where image data has been generated in PDF (Portable Document Format) and a file name "test.pdf" is specified.

The screen of FIG. 7 is designed as an HTML form. When the user selects an execution button 701, the form is submitted. When "https://www.example.com/scan-to-ftp/start" is set in Action attribute of the HTML form as shown in FIG. 7, processing is executed in the following manner. An HTTPS POST request 508 in which the path (/scan-to-ftp/start) is specified is transmitted to the Web server 103 (https://www.example.com). Scan settings, such as an image format selected by the user, and transmission settings, such as file name, are sent to the Web server 103 in the HTTPS POST request 508 as data of a main body (or an entity) of the HTTP request.

The Web server 103 executes a Web application to process the request. Specifically, the Web server 103 first checks whether image processing parameters received, such as scan and transmission settings, are appropriate. If the parameters are appropriate, the Web server 103 generates an HTML document corresponding to an in-process screen D5 for indicating to the user that processing is currently being executed, and sends the document as an HTTPS POST response 509. The Web server 103 further requests a Scan-To-FTP service provider 454 to execute processing for conducting scanning and FTP transmission utilizing services provided by the image processing apparatus. A mechanism to identify a method to request processing will be described later. In a SOAP request 510, image processing parameters (including the scan and transmission settings received from the Web browser 440) are passed. A URI corresponding to a screen that should be displayed on the Web browser 440 when a service of a service provider is completed (here, https://www.example.com/scan-to-ftp/complete) is also provided as a recovery URI.

Upon receiving the SOAP request 510, the service provider 454 executes scanning of a document image in the image processing management unit 490 and returns a SOAP response 511. The service provider 454 requests a window management function of the operation unit 219 to change the screen so that a preview screen D6 is displayed at a position visible to the user (screen transition T2).

If an error, such as a jam, occurs during image processing operation such as scanning, the service provider 454 transitions to a jam recovery etc. screen D7 (screen transition T3). On the screen D7, the service provider 454 interacts with the user and/or the image processing management unit 490 to recover from the error, and returns to the preview screen D6 (screen transition T4).

Figure 8:
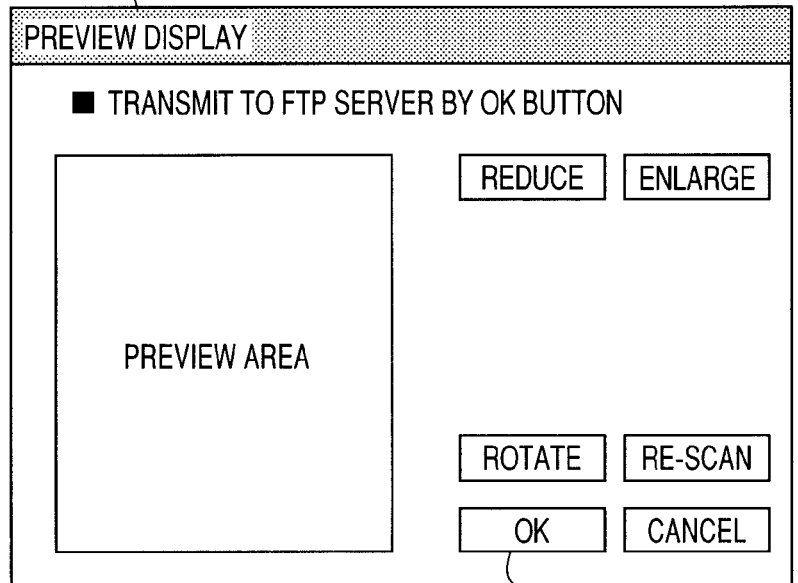
FIG. 8 illustrates a native screen in the embodiment of the invention.

FIG. 8 illustrates an example of the preview screen, which is a native screen displayed on the operation unit 219 by the Scan-To-FTP service provider 454. The preview screen includes an area in which a preview for scanned-in image data is displayed, a Reduce button, an Enlarge button, a Rotate button, a Re-scan button, an OK button, and a Cancel button. The Reduce and Enlarge buttons respectively specify reduced and enlarged display of a preview image in the preview area. The Rotate button is for specifying rotation of image data. Each time the Rotate button is pressed, scanned-in image data is rotated by 90 degrees clockwise, and at the same time, a displayed image in the preview display area is also rotated. The Re-scan button is for scanning an image again to replace existing scanned-in image data. The OK button is for sending scanned-in image data.

When the user chooses the OK button 801, scanned-in image data is uploaded by FTP 512 with a predetermined file name to a predetermined directory of the file server 102 that is specified in the transmission setting passed in the SOAP request 510.

When processing requested in the SOAP 510 request is complete, the service provider 454 notifies the Web browser 440 of the recovery URI specified by the Web server 103 (recovery URI 513) so as to display the screen on the Web browser 440 (screen transition T5).

The Web browser sends an HTTPS GET request 514 for the recovery URI 513 to the Web server 103. The Web server 103 runs the Web application, generates an HTML document corresponding to a completion screen D8, and sends the document to the Web browser 440 as an HTTPS GET response 515.

The Web browser 440 interprets the HTML document received and displays the HTML document on the operation unit 219 as the completion screen D8. When the user chooses a button to return to the menu, the Web browser 440 sends an HTTPS GET request 516 to a URI corresponding to the function selection screen D3 (https://www.example.com/). The Web server 103 receiving the request returns the function selection screen D3 as with the HTTPS POST response 505, and subsequently this sequence is repeated.

Figure 9:
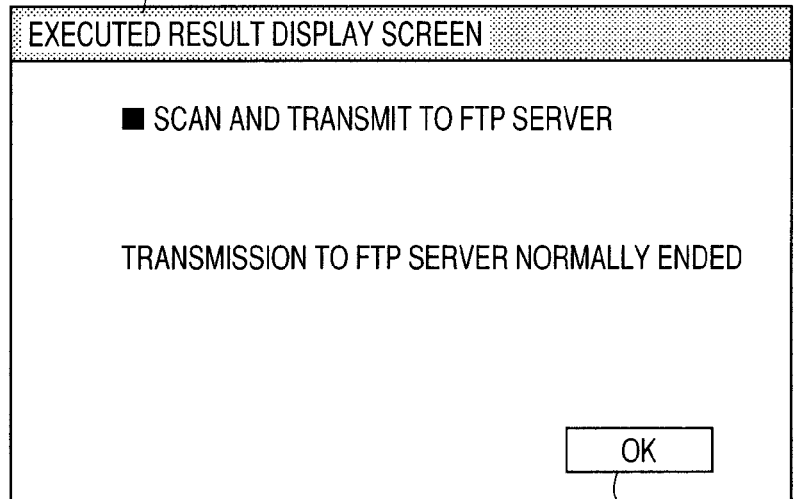
FIG. 9 illustrates a Web browser screen in the embodiment of the invention.

FIG. 9 illustrates an example of an executed result display screen (i.e., a Web browser screen) displayed by the Web browser of the MFP 101. On the executed result display screen, information indicating the result of processing executed by the MFP 101 is shown. When the user chooses a button 901, the HTTPS GET request 516 for a URI corresponding to the function selection screen D3 (https://www.example.com/) is transmitted.

Figure 10:
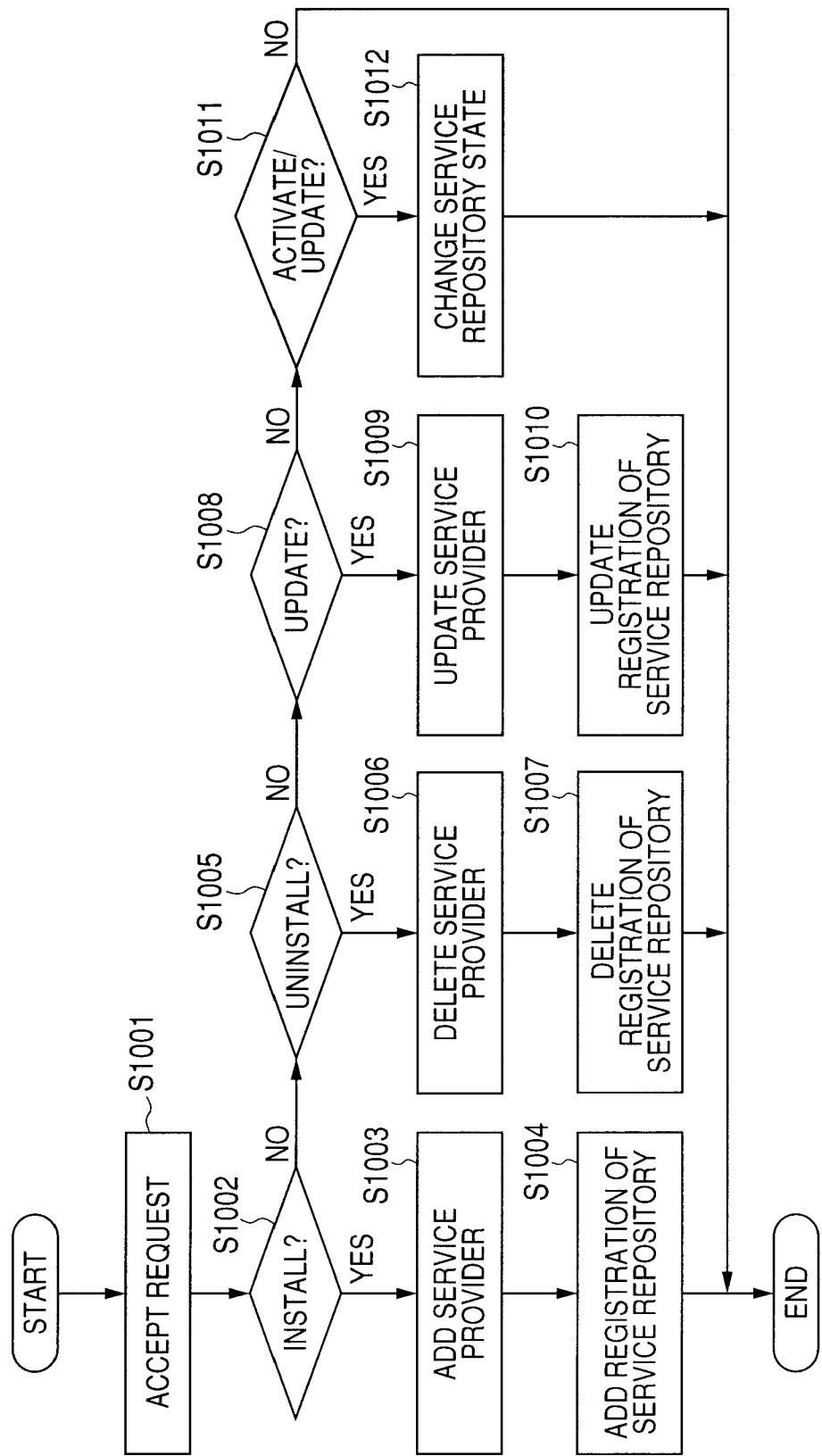
FIG. 10 is a flowchart illustrating operations of the MFP 101 in the embodiment of the invention.

FIG. 10 is a flowchart illustrating a processing procedure for the service provider framework 454. The operations (steps) shown in the flowchart of FIG. 10 are realized by the CPU 211 of the MFP 101 executing a control program stored in the HDD 214.

At step S1001, a request relating to management of the service providers 450 is accepted. At the following step S1002, it is determined whether the request accepted is for installation of a new service provider 450 or not. If it is determined that the request accepted is for installation of a new service provider 450, the flow proceeds to step S1003, and if not, to step S1005.

At step S1003, a service provider 450 is added by carrying out installation of the service provider 450. Then, at step S1004, information about the newly installed service provider 450 is added to the service repository unit 492.

At step S1005, it is determined whether the request accepted is for uninstallation of a service provider 450 or not. If it is determined that the request accepted is for uninstallation of a service provider 450, the flow proceeds to step S1006, and if not, to step S1008.

At step S1006, a service provider 450 is deleted by carrying out uninstallation of the service provider 450. Then, at step S1005, information about the uninstalled service provider 450 is deleted from the service repository unit 492.

At step S1008, it is determined whether the request accepted is for update of a service provider 450. If it is determined that the request accepted is for update of a service provider 450, the flow proceeds to step S1009, and if not, to step S1011.

At step S1009, a service provider 450 is updated by carrying out update of the service provider 450. Then, at step S1010, information about the updated service provider 450 is updated in the service repository unit 492.

At step S1002, it is determined whether the request accepted is for activation or change of state of a service provider 450 or not. If it is determined that the request accepted is for activation or change of state of a service provider 450, the flow proceeds to step S1012, and if not, the processing is terminated. At step S1012, the state of an updated service provider 450 managed in the service repository unit 492 is changed.

As described above, services that can be provided by the MFP 101 to the Web server 103 dynamically change.

FIG. 11 illustrates an example of service repository information stored in the service repository unit 492. Service repository information is stored in the HDD 214, for example. Each record of service repository information is associated with each of service providers 450 managed by the service provider framework 454.

A service ID is an identifier that identifies each one of the service providers 450. Version is the version of each of the service providers 450. State indicates whether each of the service providers 450 is active or inactive. Connection indicates a connection method for use when the logic section 412 of the Web application 410 utilizes a service provided by any of the service providers 450. A connection URI (location URI) indicates a URI that identifies a location to which connection should be made for utilizing a service provided by any of the service providers 450.

FIG. 12 illustrates an example of URI information stored in the URI information storage unit 493. URI information is stored in the HDD 214, for example. A URI pattern is used for pattern matching against a URI to which an access is made when the Web browser 440 sends an HTTP request to the Web application 410. A URI comprises a scheme section, an authority component section, and a path section. For each of the sections, a pattern including an arbitrary number of wildcards can be specified. A wildcard is represented by the character "*", matching any character string. Pattern matching with regular expression of a higher level may be performed.

A service pattern is a pattern used for searching for service providers 450. The service pattern represents a pattern for performing pattern patching against records stored in the service repository unit 492. By arranging the patterns of service IDs, a corresponding one of the service providers 450 can be extracted. When a list is empty, information on the service providers 450 is not supplied. As the pattern of a service ID, a pattern including an arbitrary number of wildcards can be specified. A wildcard is represented by the character "*", matching any character string. Pattern matching with regular expression of a higher level may be performed.

When accessing (or sending an HTTP request to) a URI that matches any of the URI patterns shown in FIG. 12, the Web browser 440 passes information on a service provider matching the service pattern of the corresponding record to the Web application 410.

Figure 13:
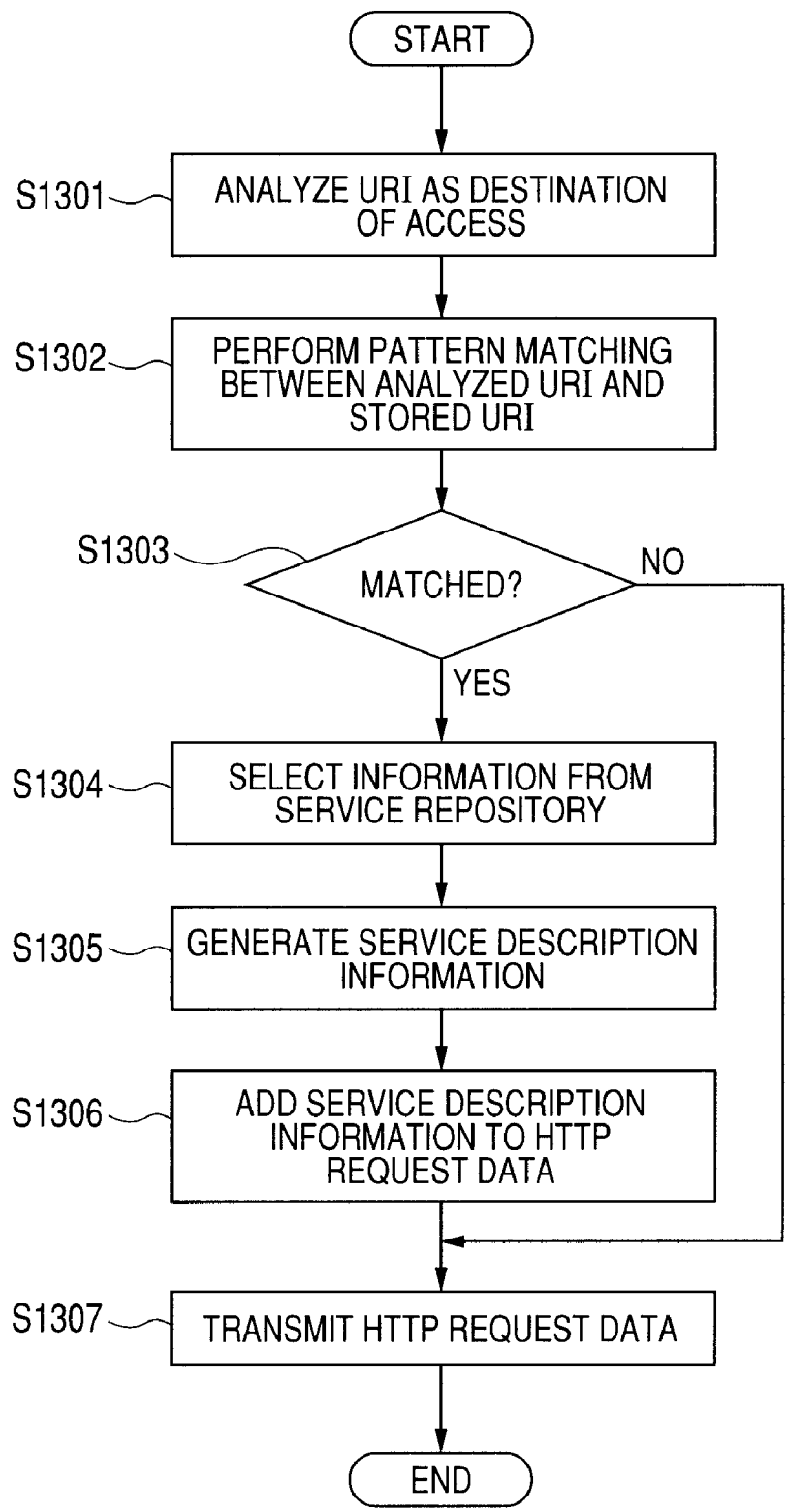
FIG. 13 is a flowchart illustrating operations of the MFP 101 in the embodiment of the invention.

FIG. 13 is a flowchart illustrating a procedure of HTTP request transmission processing from the Web browser 440. The operations (steps) shown in the flowchart of FIG. 13 are realized by the CPU 211 of the MFP 101 executing a control program stored in the HDD 214.

At step S1301, a URI as the destination of access is analyzed. And at step S1302, pattern matching between the URI and URI information stored in the URI information storage unit 493 is performed.

At step S1303, it is determined whether the URI from which an operation screen is requested (i.e., the other party of communication which the Web browser 440 is accessing) matches any of pieces of URI information stored in the URI information storage unit 493. If it is determined that the URI matches a piece of URI information, the flow proceeds to step S1304, and if not, the flow proceeds to step S1307.

At step S1304, information corresponding to the matching pattern is selected from pieces of service repository information stored in the service repository unit 492, and service description information to be supplied to the Web application 410 is generated at step S1305.

At step S1306, the generated service description information is stored in the header section of HTTP request data, which is transmitted at step S1307. If it is determined at step S1303 that the URI does not match any URI information, HTTP request data in which no service description information is stored is transmitted at step S1307.

FIG. 14 illustrates an example of the header section of HTTP request data generated by the Web browser 440. By embedding service description information provided by the service providers 450 in the header section of HTTP request data, information on service providers provided by the MFP 101 can be supplied to the Web application 410. In the example shown in FIG. 14, a URI for connecting to a service provider 450 called "/sp/scan-ftp" is described. The description "2.0" following "/sp/scan-ftp" indicates that the version of the service provider 450 is 2.0. In service description information, any of various sorts of service provider information shown in FIG. 11 can be written. If the process at step S1306 of FIG. 13 is not performed, HTTP request data that does not include the description "/sp/scan-ftp 2.0;/sp/scan-preview-ftp 1.8;/sp/ipp-print 3.0" of FIG. 14 is transmitted.

By the Web application 410 receiving information on utilization of services provided by the MFP 101 in the HTTP request header, it is possible to realize a distributed system that can flexibly accommodate functions of the MFP 101, for example.

That is to say, if the MFP 101 provides a reading checking service with a scan preview, display of a preview and checking by the user are made be performed on the MFP 101 and the Web application can acquire image data for which preview checking is already done. Meanwhile, if the MFP 101 does not provide such a service, the Web application 410 once acquires scanned-in image data, and generation of a preview image, its display on the browser, and checking by the user's can be performed as server-side processing of the Web application 410. Alternatively, the user may be prompted to install a service provider 450 that provides a scan preview checking service.

Further, if the MFP 101 includes an OCR function option, document data that has been converted into a PDF file with character codes resulting from OCR added can be obtained on the MFP 101, and if the MFP 101 does not have such an option, the Web application 410 could be configured to generate such a PDF file.

Or, if the MFP 101 is capable of generating a certain image format, the MFP 101 can acquire a file created in the specified format, and if the MFP 101 is not, the Web application 410 may be configured to convert a file into the format.

Or, if the MFP 101 has facsimile transmission function, the Web application 410 has the MFP 101 send data by fax, and if the MFP 101 does not, the Web application 410 may be configured to request the MFP 101 to send data by a file transfer protocol, such as FTP and SMB (Server Message Block), to the Web server 103, and the Web server 103 may be configured to send the data by fax.

The MFP 101 may also include a Service Discovery service provider 450 for the Web server 103 to reference service provider information stored in the service repository unit 492. The Service Discovery service can be configured as a service similar to UDDI (Universal Description, Discovery, and Integration), a known technique. In that case, the Web application 410 first accesses the Service Discovery service to inquire about information for acquiring more detailed provided-service description information.

While the present embodiment configures the Web server 103 to utilize services provided by the MFP 101 with a so-called Web service technique known as SOAP or REST, the technique may also be replaced with other techniques or some techniques may be combined. For instance, an interface for accessing a function of the image processing apparatus may be extended by extending DOM (Document Object Model), and the function may be utilized from a script language that operates in the Web browser, such as Java™ Script.

In this case, functions for acquiring information about available services may be provided as the interface to the expanded DOM. In other words, it is easy to have an interface for a script to learn the types and/or ability of services provided by the image processing apparatus or a connection method for utilizing the services. In this case, the script and an HTML FORM element are combined within content to be returned to the Web browser from the Web server. When an HTTP request based on the content is sent from the Web browser to the Web server, service description information can be included in the transmitted HTTP request. In such a configuration, however, service description information cannot be provided in the initial HTTP request from the Web browser to the Web application.

As described above, in the present embodiment, when the Web browser 440 of the MFP 101 requests an operation screen from the Web server 103, the Web browser 440 sends provided-service description information in the HTTP request. Provided-service description information includes types of services provided by the service providers 450, their version, state, a method or destination of connection for utilizing the services. The provided-service description information also reflects and indicates option constitutions possessed by the MFP 101.

Also, depending on where the Web browser 440 accesses, whether to supply provided-service description information or not, or contents of provided-service description information to be supplied is changed.

This enables the Web application 103 to learn services that can be currently provided by the MFP 101 and change processing according to the ability of provided services. Also, when one Web server 103 and a number of MFPs 101 constitute a distributed system, a Web application 103 that varies processing according to the ability of the individual MFPs 101 can be implemented.

In addition, the logic section 412 of the Web application 103 is allowed to reliably learn a method and/or destination of connection for utilizing a service provided by the MFP 101 in the course of HTTP request processing. This facilitates implementation of a Web application 103 that utilizes services without fail.

Also, by not supplying provided-service description information when it is determined that supply of provided-service description information is not necessary, unnecessary information is not supplied to a Web server that does not constitute the distributed system.

Also, provided-service description information to be supplied can be changed to the pattern of a URI to which the Web browser 440 sends an HTTP request. In general, the Web server 103 groups Web applications or functions based on URI path hierarchy. Therefore, this enables only appropriate provided-service description information to be selectively supplied according to functions provided by the Web application 410.

In addition, while the descriptions above illustrates supply of information about the service providers 450 as information relating to the image processing apparatus (the MFP 101), other information may be supplied in a similar manner. For example, a serial number (production number) for uniquely identifying the MFP 101, a user ID that indicates the user who is currently logged into the MFP 101, or information about options attached to the MFP 101 can be applied for supply to the Web server. Information about processing (jobs) now being executed on the MFP 101 or information about a failure occurring on the MFP 101 itself may be applied for supply to the Web server.

<Other Embodiments>

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-149053, filed on Jun. 23, 2009, which is hereby incorporated by reference herein in its entirety.

The invention claimed is:

1. An image processing apparatus including a Web browser for displaying an operation screen provided by a Web server, the image processing apparatus comprising: a processing unit that, when requested to execute image processing by the Web server based on access from the Web browser, executes the requested image processing; a determination unit that determines, depending on a destination of access made by the Web browser, whether or not to supply information about the image processing apparatus to the destination of access; and a notification unit that supplies the information about the image processing apparatus to the destination of access made by the Web browser if the determination unit determines that the information about the image processing apparatus should be supplied, but does not supply the information about the image processing apparatus to the destination of access made by the Web browser if the determination unit determines that the information about the image processing apparatus should not be supplied, wherein the notification unit performs the supply by storing the information about the image processing apparatus in a header section of HTTP request data transmitted by the Web browser.

2. The image processing apparatus according to claim 1, further comprising a storage unit that prestores particular URIs, wherein the determination unit determines that the information about the image processing apparatus should be supplied when the destination of access made by the Web browser matches a URI stored in the storage unit.

3. The image processing apparatus according to claim 1, wherein the information about the image processing apparatus is information about the processing unit.

4. The image processing apparatus according to claim 3, wherein the information about the processing unit is information indicating a type of image processing executed by the processing unit, a version of the processing unit, or a method of connection to the processing unit.

5. An image processing apparatus including a Web browser for displaying an operation screen provided by a Web server, the image processing apparatus comprising: a plurality of different processing units that, when requested to execute image processing by a selection unit that selects information to be supplied to a destination of access made by the Web browser from among pieces of information relating to each of the plurality of processing units; and a notification unit that supplies the information selected by the selection unit to the destination of access made by the Web browser, while not supplying information not selected by the selection unit to the destination of access made by the Web browser, wherein the notification unit performs the supply by storing the information about the image processing apparatus in a header section of HTTP request data transmitted by the Web browser.

6. The image processing apparatus according to claim 5, wherein the selection unit selects information to be supplied to a destination of access made by the Web browser according to the destination of access.

7. The image processing apparatus according to claim 6, further comprising: a management unit that manages a URI used as the destination of access by the Web browser and information to be supplied to the URI in an associated manner, wherein the selection unit selects information managed being associated with a URI specified as the destination of access by the Web browser.

8. The image processing apparatus according to claim 5, wherein the information about each of the processing units is information indicating a type of image processing executed by each of the processing units, a version of each of the processing units, or a method of connection to each of the processing units.

9. A control method for an image processing apparatus including a Web browser for displaying an operation screen provided by a Web server and a processing unit that, when requested to execute image processing by the Web server based on access from the Web browser, executes the requested image processing, the method comprising: determining, depending on a destination of access made by the Web browser, whether or not to supply information about the image processing apparatus to the destination of access; and supplying the information about the image processing apparatus to the destination of access made by the Web browser if it is determined in the determining step that the information about the image processing apparatus should be supplied, but not supplying the information about the V0043 processing apparatus to the destination of access made by the Web browser if it is determined in the determining step that the information about the image processing apparatus should not be supplied, wherein the supplying step performs the supply by storing the information about the image processing apparatus in a header section of HTTP request data transmitted by the Web browser.

10. A control method for an image processing apparatus including a Web browser for displaying an operation screen provided by a Web server and a plurality of different processing units that, when requested to execute image processing by the Web server based on access from the Web browser, executes the requested image processing, the method comprising: selecting information to be supplied to a destination of access made by the Web browser from among pieces of information relating to each of the plurality of processing units; and supplying the information selected by the selecting step to the destination of access made by the Web browser, while not supplying information not selected by the selecting step to the destination of access made by the Web browser, wherein the supplying step performs the supply by storing the information about the image processing apparatus in a header section of HTTP request data transmitted by the Web browser.

11. A non-transitory computer-readable medium on which is stored computer-executable code of a computer program for causing a computer to implement the control method according to claim 9.

12. A non-transitory computer-readable medium on which is stored computer-executable code of a computer program for causing a computer to implement the control method according to claim 10.

* * * * *

UNITED STATES PATENT AND TRADEMARK OFFICE
CERTIFICATE OF CORRECTION

| | | |
|---|---|---|
| PATENT NO. | : 8,326,989 B2 | Page 1 of 1 |
| APPLICATION NO. | : 12/863308 | |
| DATED | : December 4, 2012 | |
| INVENTOR(S) | : Yamamoto | |

It is certified that error appears in the above-identified patent and that said Letters Patent is hereby corrected as shown below:

IN THE CLAIMS:

In Claim 5, at column 16, lines 3 to 5:

"a plurality of different processing units that, when requested to execute image processing by a selection unit that selects information" should read
--a plurality of different processing units that, when requested to execute image processing by the Web server based on access from the Web browser, executes the requested image processing; a selection unit that selects information--, and In Claim 9, at column 16, lines 45 to 47:

"but not supplying the information about the V0043 processing apparatus" should read
--but not supplying the information about the image processing apparatus--.

Signed and Sealed this
Fourteenth Day of May, 2013

Teresa Stanek Rea
*Acting Director of the United States Patent and Trademark Office*